(12) United States Patent  
Adams

(10) Patent No.: US 7,081,848 B1  
(45) Date of Patent: Jul. 25, 2006

(54) ORTHOGONAL PULSE RANGE AMBIGUITY RESOLUTION

(75) Inventor: Gregory F. Adams, Moorestown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 50 days.

(21) Appl. No.: 10/992,012

(22) Filed: Nov. 18, 2004

(51) Int. Cl.  
*G01S 13/08* (2006.01)

(52) U.S. Cl. ............... 342/118; 342/131; 342/132; 342/134; 342/135; 342/195

(58) Field of Classification Search .......... 342/118, 342/127–137, 145, 195, 200–204  
See application file for complete search history.

(56) References Cited

U.S. PATENT DOCUMENTS

| | | | | |
|---|---|---|---|---|
| 3,877,011 A | * | 4/1975 | Holberg et al. | 342/161 |
| 3,952,302 A | * | 4/1976 | Mullins | 342/161 |
| 4,008,469 A | * | 2/1977 | Chapman | 342/22 |
| 4,353,067 A | * | 10/1982 | Mims | 342/201 |
| 4,885,590 A | * | 12/1989 | Hasan | 342/196 |
| 5,309,160 A | * | 5/1994 | Powell et al. | 342/128 |
| 5,422,646 A | * | 6/1995 | Lewis | 342/160 |
| 5,442,359 A | * | 8/1995 | Rubin | 342/109 |
| 5,726,657 A | * | 3/1998 | Pergande et al. | 342/202 |
| 5,808,580 A | * | 9/1998 | Andrews, Jr. | 342/162 |
| 6,225,943 B1 | * | 5/2001 | Curley et al. | 342/137 |

OTHER PUBLICATIONS

"Azimuth phase coding for range ambiguity suppression in SAR", Dall, J.; Kusk, A.Geoscience and Remote Sensing Symposium, 2004. IGARSS '04. Proceedings. 2004 IEEE International vol. 3, Sep. 20-24, 2004 Ps: 1734-1737.*

* cited by examiner

*Primary Examiner*—John B. Sotomayor  
(74) *Attorney, Agent, or Firm*—Duane Morris LLP

(57) ABSTRACT

A method for active ranging, such as radar, which sequentially transmits pulses of mutually different waveforms. Receive processing is performed concurrently for all the transmitted waveforms during each interpulse interval, to thereby provide range ambiguity resolution together with continuous return signal integration.

8 Claims, 4 Drawing Sheets

ORTHOGONAL PULSE RANGE AMBIGUITY RESOLUTION

FIELD OF THE INVENTION

This invention relates to active range determination systems such as radar, sonar and the like, and more particularly to reduction of range ambiguity.

BACKGROUND OF THE INVENTION

Radar and other active range determination systems are in widespread use for military, commercial, and private purposes. Radar systems have well-known characteristics, in that long-range detection of small targets is known to require transmission of more power, higher-gain antennas, and or more sensitive receivers than that or those required for short-range detection of large targets. Among the characteristics of radar systems used for detecting targets at long range are those relating to range ambiguity, which has to do with reception of signals returned from a target lying beyond the range defined by the pulse repetition interval, which may make the distant target appear to be near the radar system. Another such characteristic of radar is that of range eclipsing, which has to do with the inability of a radar receiver to receive return signals during the pulse transmission interval.

A conventional solution to range eclipsing is to vary the pulse repetition interval, so that the transmitted pulses are staggered over time, thereby allowing the receiver to periodically "see" returned signals at times which would otherwise be lost or eclipsed. The eclipsing still occurs for each individual pulse train, but the totality of the radar returns over time includes information which fills in the gaps attributable to the individual transmitted pulse trains. The tradeoff is that a longer time is required to produce all the information required for an uneclipsed view of the region. Another possible solution to range eclipsing is to reduce the duty cycle of the radar by reducing the transmitted pulse duration, to thereby reduce the duration of the eclipsing. The reduction of the pulse duration, however, tends to reduce the transmitted energy, which reduces the range sensitivity, which again requires a longer period of integration in order to obtain the same effective range.

Another possible solution to range eclipsing is to reduce the duty cycle of the radar by increasing the pulse repetition interval, to thereby move the increased range interval to a distant range not of interest. The reduction of the duty cycle and increase in the pulse repetition interval, however, tends to consume additional radar resources resulting in a greater overall time required for completion of a surveillance scan.

Conventional range ambiguity resolution techniques require transmission of additional signals with additional dwells for resolving the range interval of the ambiguous target. The additional dwells or transmissions consume additional radar resources, resulting in a greater overall time required for completion of a surveillance scan. A radar system's maximum unambiguous range (Rmax) is given by $$R_{max} = C * \frac{PRI}{2} \quad (1)$$

where:
C is the speed of light;
\* represents simple multiplication; and
PRI is the radar pulse repetition interval in seconds.

This is the maximum range from which a reflection can be received from a target before the next pulse is transmitted. It is possible for reflections from objects lying at distances greater than Rmax to arrive at the radar receiving antenna and receiver at a time after the transmission of a later pulse. The signals received from such a remote target tend to be weak, and may be obscured by reflections from a closer target or clutter.

U.S. Pat. No. 6,639,546, issued Oct. 28, 2003 in the name of Ott et al. describes sequential transmission of pulses at different frequencies, together with selective reception at the different frequencies and processing of the returns for reducing eclipsing and range ambiguity.

Improved or alternative active ranging systems are desired.

SUMMARY OF THE INVENTION

A method for range detection of targets according to an aspect of the invention comprises the step of recurrently transmitting sequential electromagnetic signal pulses at at least first and second mutually different frequencies, to thereby produce sequentially transmitted first and second pulses. During at least some interpulse intervals lying between the transmitted pulses, reflected signals, if any, resulting from the recurrent transmissions are received, to thereby produce received signals nominally at the first and second frequencies. The received signals at the first and second frequencies received during that interpulse period immediately following transmission of the second pulses are processed. Those received signals returning at the second frequency are deemed to be within a range corresponding to zero to one inter-pulse interval and those received signals returning at the first frequency are deemed to be within a range corresponding to one to two inter-pulse intervals.

A method for range determination of targets according to another aspect of the invention comprises the steps of recurrently transmitting a set of electromagnetic signals, with each set of pulses including sequential pulses at at least first, second, and third mutually different frequencies, to thereby produce recurrent sets of transmitted first, second, and third pulses. During interpulse intervals lying between the transmitted pulses, reflected signals, if any, resulting from the recurrent transmissions are received, to thereby produce received signals nominally at the first, second, and third frequencies. The received signals are sorted by frequency into first, second, and third channels, respectively, and during that interpulse interval immediately following transmission of each of the third pulses, the received signals at the third frequency are processed, and those received signals returning at the third frequency are deemed to be within a range corresponding to zero to one inter-pulse interval. During the second interpulse interval following transmission of each of the second pulses, the received signals at the second frequency are processed, and those received signals returning at the second frequency are deemed to be within a range corresponding to one to two inter-pulse intervals. During the third interpulse interval following transmission of each of the first pulses, the received signals at the first frequency are processed, and those received signals returning at the first frequency are deemed to be within a range corresponding to two to three inter-pulse intervals.

More generally, a method for ranging targets according to an aspect of the invention includes the steps of recurrently transmitting electromagnetic signal pulses at at least first, second, . . . , and Nth mutually different frequencies to thereby produce transmitted first, second, . . . , and Nth pulses. During interpulse intervals lying between the transmitted pulses, reflected signals, if any, resulting from the recurrent transmissions are received, to thereby produce received signals nominally at the first, second, . . . , and Nth frequencies. The received reflected signals are sorted by frequency into first, second, . . . , and Nth channels, respectively. During that interpulse interval immediately following transmission of each of the Nth pulses, the received signals at the Nth frequency are processed, and those received signals returning at the Nth frequency are deemed to be within a range corresponding to zero to one inter-pulse interval. During the (N−1)st interpulse interval following transmission of each of the second pulses, the received signals at the second frequency are processed, and those received signals returning at the second frequency are deemed to be within a range corresponding to corresponding to the (N−2) to (N−1) inter-pulse intervals. During the Nth interpulse interval following transmission of each of the first pulses, the received signals at the first frequency are processed, and those received signals returning at the first frequency are deemed to be within a range corresponding to the (N−1) to N inter-pulse intervals.

A method according to an aspect of the invention is for range determination of targets. The method comprises the step of recurrently transmitting a set of electromagnetic signal pulses, wherein each set of pulses includes pulses at at least first, second, and third mutually different frequencies, to thereby produce transmitted first, second, and third pulses at mutually different frequencies. During each interpulse interval lying between the transmitted first, second, and third pulses, reflected signals, if any, are received which result from the recurrent transmissions, to thereby produce received signals nominally at the first, second, and third frequencies. During that interpulse interval immediately following transmission of the first pulse, the received signals at the first frequency are processed, and those received signals returning at the first frequency are deemed to be within a range corresponding to zero to one inter-pulse interval. During that interpulse interval immediately following transmission of the second pulse, the received signals at the first frequency are processed, and those received signals returning at the first frequency are deemed to be within a range corresponding to one to two inter-pulse intervals. During the interpulse interval immediately following transmission of the second pulse, the received signals at the second frequency are processed, and those received signals returning at the second frequency are deemed to be within a range corresponding to zero to one inter-pulse interval. During the interpulse interval immediately following transmission of each of the third pulses, the received signals at the first, second, and third frequencies are processed, and those received signals returning at the first frequency are deemed to be within a range corresponding to two to three inter-pulse intervals, those received signals at the second frequency are deemed to be within a range corresponding to one to two inter-pulse intervals, and those received signals at the third frequency are deemed to be within a range corresponding to zero to one inter-pulse intervals.

According to a yet further aspect of the invention, a method for range determination of targets comprises the step of recurrently transmitting electromagnetic signal pulses at at least first, second, . . . , J . . . , and Nth mutually different frequencies, to thereby produce transmitted first, second, . . . , I, . . . , and Nth pulses. During each interpulse interval immediately following the transmitted pulses, receiving reflected signals, if any, resulting from the recurrent transmissions, to thereby produce concurrent received signals nominally at the first, second, . . . , Jth, . . . , and Nth frequencies. The received signals are sorted by frequency into first, second, . . . , Ith, . . . , and Nth channels, respectively. During that interpulse interval immediately following transmission of each of the Ith pulses, the received signals are processed at the corresponding Jth frequency, and those received signals returning at the Jth frequency are deemed to be within a range corresponding to (1−J) to (1−J+1) inter-pulse intervals.

DESCRIPTION OF THE INVENTION

Figure 1A:
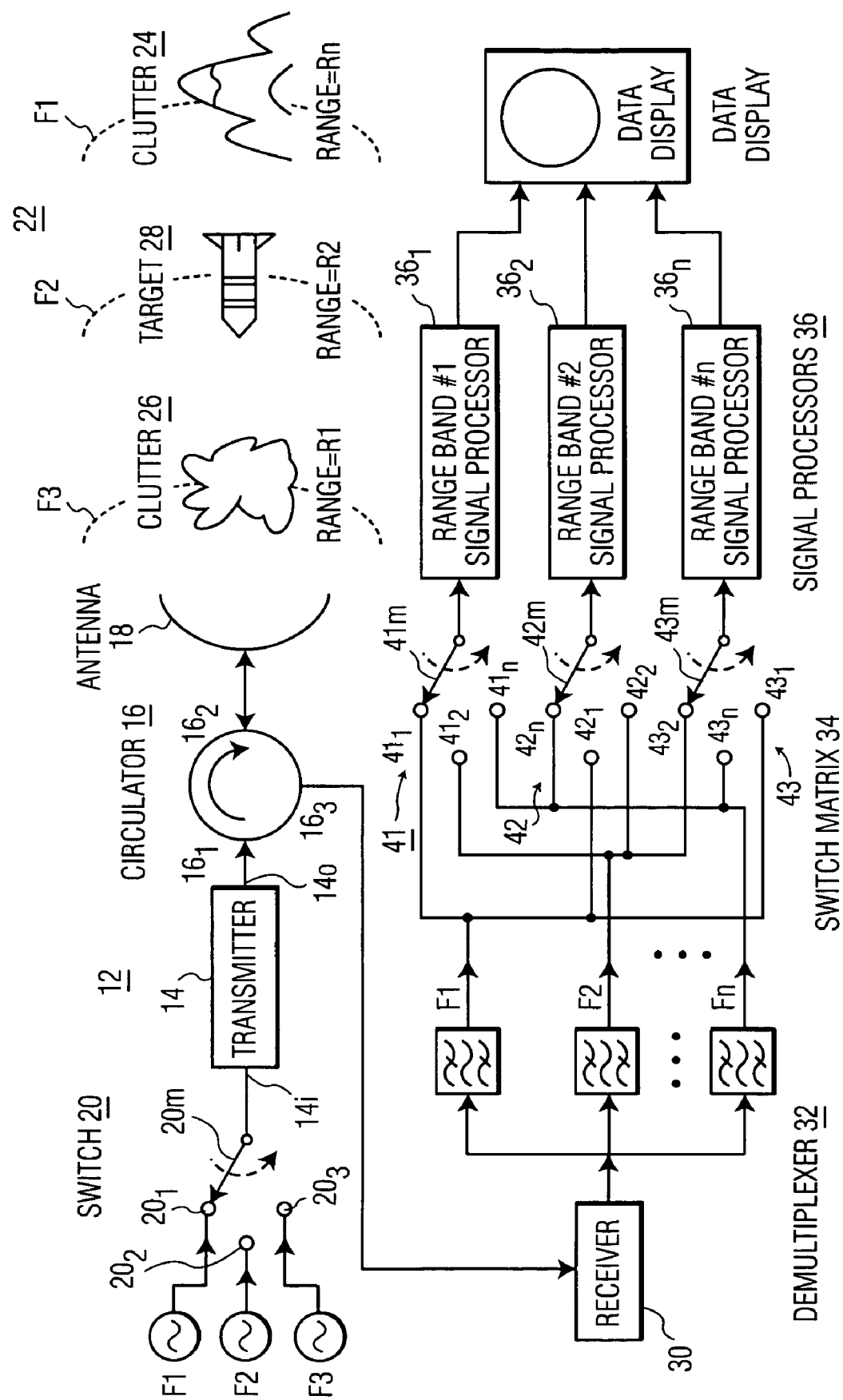
FIG. 1a is a simplified block diagram of a radar system, which is taken as being representative of all forms of active ranging systems, with a switch matrix in a first state.

In FIG. 1a, a radar system 10, which is taken to be representative of any type of active ranging system such as sonar or lidar, includes a transmitter arrangement designated generally as 12. Transmitter arrangement 12 includes a transmitter illustrated as a block 14, the output port 14o of which is coupled by way of ports 161 and 162 of a circulator 16 to an antenna represented as a reflector 18. Those skilled in the art know that other types of antennas, such as arrays, can be used. First, second and third waveform generators WF1, WF2, and WF3 are coupled to terminals 201, 202, and 203, respectively, of a switch 20. Switch 20 is conventionally represented as being a mechanical single-pole, triple-throw switch, but those skilled in the art will understand that this is but a convention for ease of understanding, and that electronic switch equivalents are used in practice. A movable member 20m of switch 20 sequentially contacts terminals 201, 202, and 203 during operation, thereby coupling to the input port 14i of transmitter 14 waveforms WF1, WF2, and WF3 in a fixed sequence. These waveforms are selected to be separable even after Doppler shifts introduced by the movement of targets. The waveforms may be made separable by using different carrier frequencies, such as the frequencies F1, F2, and F3 illustrated in FIG. 1a, different modulation functions, or by varying any other characteristic which makes the waveforms distinguishable to the receiving system. For purposes of explanation, it is assumed that the separable characteristic is frequency.

Transmitter 14 of FIG. 1a transmits pulses under control of the waveform generators WF1, WF2, and WF3. The pulses are transmitted in sets, where each set includes a pulse of one of WF1, WF2, and WF3. Assuming that a pulse of waveform WF1 is transmitted first, a pulse of waveform WF2 is transmitted after the WF1 pulse, and that a pulse of waveform WF3 is transmitted last in a sequence of pulses, the relative positions of the pulses as radiated by antenna 18 into space 22 is illustrated by curved dash lines designated WF1, WF2, and WF3. At the time represented in FIG. 1a, the radiated energy transmitted of waveform WF1 has been traveling for the longest period of time, and thus has reached a distant location at a range RN, near clutter illustrated as a mountainous region 24. The most recently transmitted pulse of waveform WF3 has been traveling for the shortest interval, and has reached only a range R1, near clutter illustrated as a raincloud 26. The pulse of waveform WF2 is intermediate pulses at waveforms WF1 and WF3, and thus has been traveling for an intermediate length of time. As illustrated, the transmitted pulse of waveform WF2 has reached a range R2, which is near an important, low reflectivity target 28 illustrated as a missile 28.

Under the conditions described in conjunction with FIG. 1a and pulses WF1, WF2, and WF3 in region 22, reflections from raincloud 26 will first occur of waveform WF1, then of waveform WF2, and finally of waveform WF3. Additional returns will be reflected of waveforms WF1, WF2, and WF3 from missile 28 and from mountainous clutter 24. These reflections or returns will return to the antenna 18, and will be coupled from port 162 to port 163 of circulator 16, and thence to a receiver illustrated as a block 30. Receiver 30 performs conventional functions such as low-noise amplification and downconversion, in either digital or analog fashion, or in a mix of digital and analog.

It may occur that reflections of WF1 from range R3, of WF2 from range R2, and of WF3 from range R1 arrive at the receiving system at the same instant in time. In this case, the desired target at range R2 will not be obscured by the other reflections, because the reflections are separated according to their associated waveforms.

The invention has been described so far as involving only three waveforms, but is not so limited. As many as N waveforms can be used, and as few as two. To emphasize this point, the signals from receiver 30 are illustrated in FIG. 1a as being applied to a demultiplexing array 32 of N filters designated WF1, WF2, . . . , WFn. To keep the description of the operation simple, however, the Nth pulses or elements of the general aspect of the invention may be described as the 3d pulse or element. Each filter F1, F2, . . . Fn of demultiplexer 32 passes the return signals of its own waveform, or in the case of the specific example, of its own frequency. Thus, the signals of waveform WF1 from whatever range are transmitted by filter F1 of demultiplexer 32, the signals of waveform WF2 from whatever range are transmitted by filter F2, and the signals of waveform WFn from whatever range are transmitted by filter Fn of demultiplexer 32. Signals of waveforms not associated with a filter are not transmitted, as for example signals of waveform WF1 are not transmitted by filters F2 or Fn. Those skilled in the art will recognize that rather than being not transmitted, signals of waveforms not associated with a filter may be merely attenuated relative to signals of waveforms which are associated with the filter.

The signals received from receiver 30 are thus channelized in accordance with their original waveforms. The channelized or frequency-separated return signals are applied by way of a switch matrix designated generally as 34 to an array 36 of signal processors 361, 362, and 36n. The signal processors perform conventional functions such as integration and Doppler processing. Each signal processor of array 36 is dedicated to a single range band, and thus signal processor 361 of array 36 is dedicated to range band 1, which comprises those ranges nominally corresponding to zero distance to the distance corresponding to one interpulse interval. Signal processor 362 of array 36 is dedicated to range band 2, which comprises those ranges corresponding to one to two interpulse intervals . . . , and signal processor 36n of array 36 is dedicated to range band n, which comprises those ranges corresponding to (n−1) to (n) interpulse intervals. In order to respond to range band 1, range band 1 processor 361 begins counting time from the time of transmission of the latest pulse from antenna 18, and determines the range of any target of any waveform WF1, WF2, . . . WFn which it receives at its input port, by applying C, the speed of light, to the round trip time. In order to respond to range band 2, range band processor 362 must count time from the transmission of the pulse preceding the current pulse, which may be termed a "penultimate" pulse.

Switch matrix 34 performs the function of routing the appropriate return signals from demultiplexer 32 to signal processor array 36. To more fully explain the operation of switch matrix 34 of FIG. 1a, its individual switches are illustrated as mechanical switches 41, 42, and 43. Each switch 41, 42, and 43 of switch matrix 34 includes a movable element or portion 41m, 42m, and 43m, and each switch 41, 42, and 43 includes three switch terminals to which the movable element makes contact in a fixed sequence. As illustrated in FIG. 1a, the movable element 41m of switch 41 makes contact in sequence to switch terminals 411, 412, and 41n. Similarly, the movable element 42m of switch 42 makes contact in sequence to switch terminals 42n, 421, and 422. Movable element 43m of switch 43 makes contact in sequence to switch terminals 432, 43n, and 431. The position of switches 41, 42, and 43 in FIG. 1a is referred to as the first state, or state I.

Figure 1B:
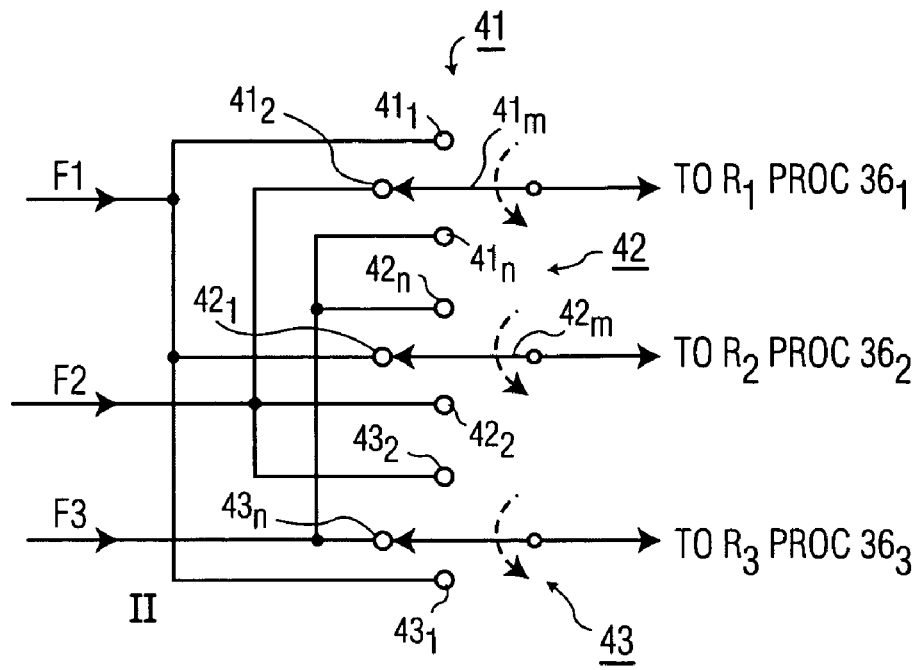
FIGS. 1b and 1c illustrate the switch in second and third states, respectively.
Figure 1C:
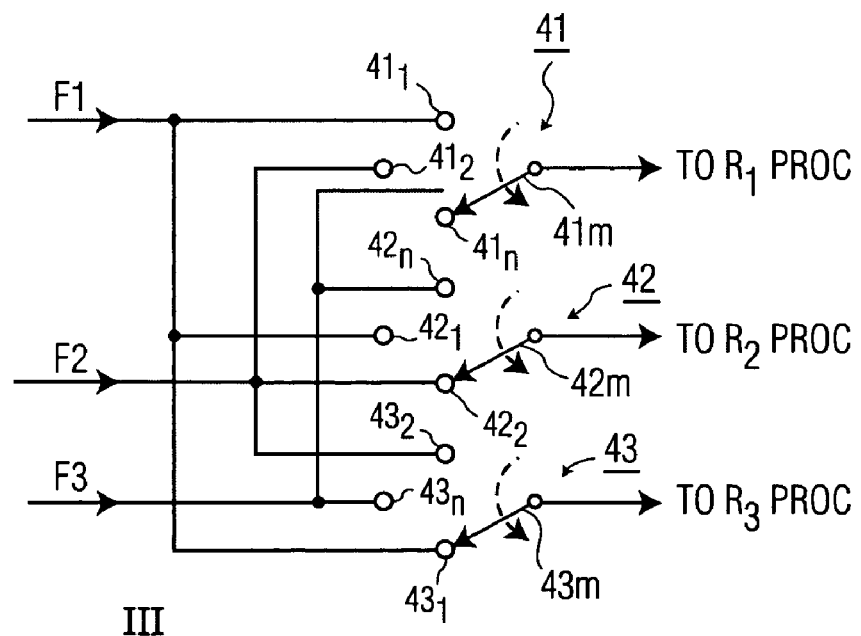

FIG. 1b illustrates switch matrix 34 of FIG. 1 in a second or II state, different from the first or I state illustrated in FIG. 1a. In the second state, movable elements 41m, 42m, and 43m have rotated counterclockwise by one terminal position, so that movable element 41m makes contact with terminal 412, movable element 42m makes contact with terminal 421, and movable element 43m makes contact with terminal 43n. Similarly, FIG. 1c illustrates switch matrix 34 of FIG. 1 in a third or III state, different from the I and II states illustrated in FIGS. 1a and 1b, respectively. In the third (III) state, movable elements 41m, 42m, and 43m have again rotated counterclockwise by one terminal position, so that movable element 41m makes contact with terminal 41n, movable element 42m makes contact with terminal 422, and movable element 43m makes contact with terminal 431.

Figure 2A:
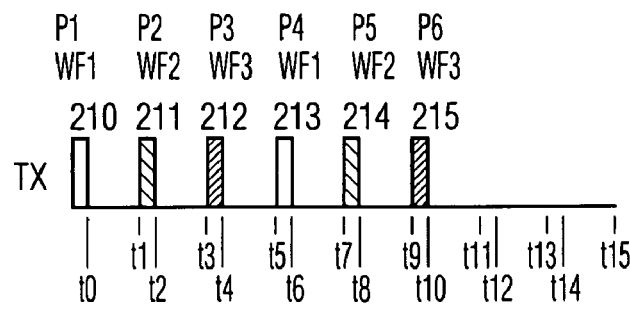
FIG. 2a is a timing diagram showing transmitted pulses.
Figure 2B:
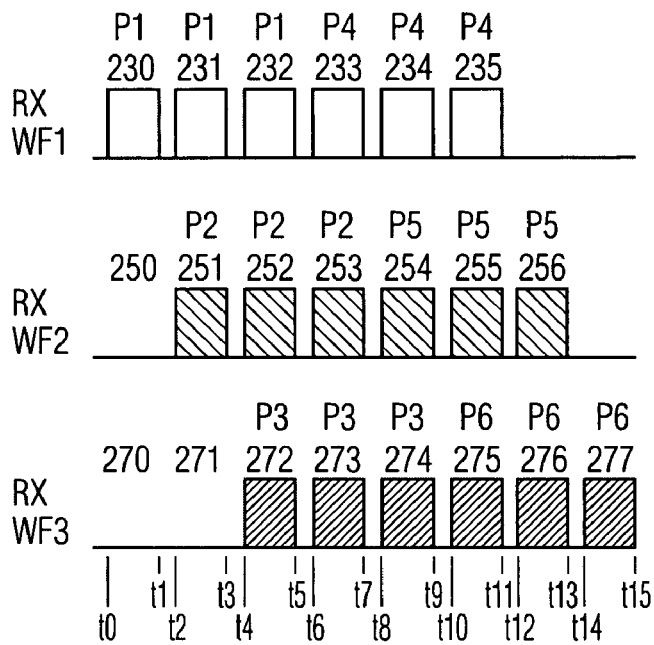
FIG. 2b shows timing diagrams illustrating receiving (RX) or listening channels WF1, WF2, and WF3 as applied to the input of a switch matrix.
Figure 2C:
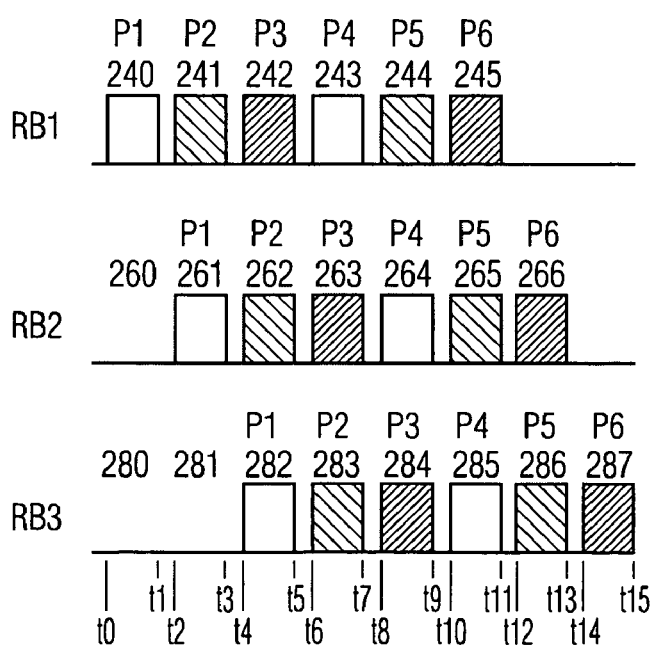
FIG. 2c shows timing diagrams, sorted by range band (RB), illustrating outputs from the switch matrix.

As described in conjunction with FIGS. 2a, 2b, and 2c, the processors of signal processor array 36 of FIG. 1a produce integrated or summed signals which can be displayed on display 50 of FIG. 1a at times related to the actual distance of the associated target from the transmitter.

Figure 3A:
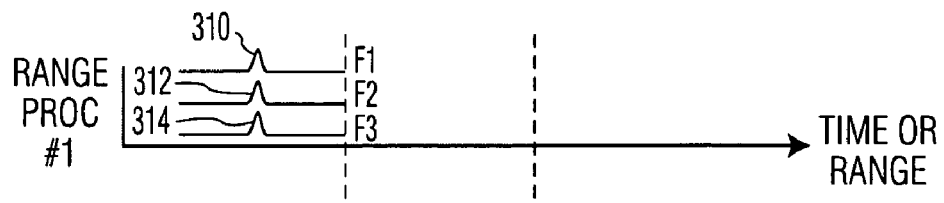
FIGS. 3a, 3b, and 3c illustrate generally the distribution of target returns resulting from the various frequencies.

[RB1 WF1] FIGS. 2a, 2b, and 2c represent time lines showing transmission of pulses of waveforms WF1, WF2, and WF3, and also showing the net receiver operation. FIG. 2d designates the time intervals of FIGS. 2a, 2b, and 2c as corresponding to a state I, II, or III of switch matrix 34 of FIG. 1. As illustrated in FIG. 2a, pulses 210 and 213 using waveform WF1 are transmitted ending at times designated as t0 and t6. Similarly, pulses 211 and 214 using waveform WF2 are transmitted ending at times designated as t2 and t8, and pulses at 212 and 215 using waveform WF3 are transmitted ending at times designated as t4 and t10. In the time interval illustrated as time t0 to time t1 (the time of the beginning of the pulse ending at time t2) of FIG. 2a, switches 41, 42, and 43 of FIG. 1a are in the illustrated positions or in state I, and received signal corresponding to waveform WF1 is coupled from switch terminal 411 to terminal 41m of switch 41 and thence to range band #1 signal processor 361. Signal processor 361 measures time from the latest or most recent pulse (the pulse designated P1 in the interval preceding time t0), and produces signals, suggested by plot 310 of FIG. 3a, representing the presence of the clutter 26 target, as indicated by the return of waveform WF1. Measurement of time relative to a particular event can be accomplished by time-tagging the various signals. The function of reception of signal of waveform WF1 in time interval t0 to t1 is suggested in FIG. 2b by the waveform WF1 reception block 230. After being routed by the switch matrix 34, the signal is represented by the range band RB1 reception block 240.

[RB1 WF2] In the time interval illustrated as time t2 to time t3 (where time t3 is the time of the beginning of the pulse ending at time t4) of FIG. 2a, movable element 41m of switch 41 of FIG. 1a has advanced one step counterclockwise (CCW) from the position illustrated in FIG. 1a the position illustrated in FIG. 1b, corresponding to position II, and received signal corresponding to waveform WF2 is coupled from switch terminal 412 to terminal 41m of switch 41 and thence to range band #1 signal processor 361. Signal processor 361 measures time from the latest pulse (WF2 pulse 211 of FIG. 2a), and produces signals, suggested by plot 312 of FIG. 3a, representing the presence of the clutter 26 target, as indicated by the return of waveform WF2. The function of reception of signal of waveform WF2 in time interval t2 to t3 is suggested in FIG. 2b by the waveform WF2 reception block 251. After being routed by the switch matrix 34, the signal is represented by the range band RB1 reception block 241.

[RB1 WF3] In the time interval t4 to t5 of FIG. 2a, movable element 41m of switch 41 of FIG. 1a has advanced by another step CCW to the position represented in FIG. 1c (state III), so that the movable contact 41m contacts terminal 41n. In this position, returned signals of waveform WF3 (or WFn in the general case) are coupled through switch 41 to range band #1 signal processor 361. Processor 361 processes the return arising from waveform WF3 by reference to the time of transmission of the latest pulse (WF3 pulse 212 of FIG. 2a in this case) to produce a target indication at the appropriate range, as suggested by plot 314 of FIG. 3a. The function of reception of signal of waveform WF3 in time interval t4 to t5 is suggested in FIG. 2b by the waveform WF3 reception block 272. After being routed by the switch matrix 34, the signal is represented by the range band RB1 reception block 242.

[RB1 WF1 again] In an interval ending at a time t6, a pulse is transmitted using waveform WF1, as suggested by pulse 213 in FIG. 2a. In the time interval t6 to t7 of FIG. 2a, movable element 41m of switch 41 of FIG. 1a has advanced by another step CCW, and returned to its I state or position as illustrated in FIG. 1a, so that the movable contact 41m contacts terminal 411. In this position, returned signals of waveform WF1 are coupled through switch 41 to range band #1 signal processor 361. Processor 361 processes the return arising from waveform WF1 by reference to the time of transmission of the latest pulse (WF1 pulse 213, in this case) to again produce a target indication at the appropriate range, as suggested by plot 310 of FIG. 3a. The function of reception of signal of waveform WF1 in time interval t6 to t7 is suggested in FIG. 2b by the waveform WF1 reception block 233. After being routed by the switch matrix 34, the signal is represented by the range band RB1 reception block 243.

[RB1 WF2 again] In the time interval illustrated as time t8 to time t9 (where time t9 is the time of the beginning of the pulse 215 ending at time t10) of FIG. 2b, movable element 41m of switch 41 of FIG. 1a has advanced one step counterclockwise (CCW) from the I state or position illustrated in FIG. 1a to position II of FIG. 1b, and received signal corresponding to waveform WF2 is coupled from switch terminal 412 to terminal 41m of switch 41 and thence to range band #1 signal processor 361. Signal processor 361 measures time from the latest pulse (WF2 pulse 214), and produces signals, suggested by plot 312 of FIG. 3a, representing the presence of the clutter 26 target, as indicated by the return of waveform WF2. The function of reception of signal of waveform WF2 in time interval t8 to t9 is suggested in FIG. 2b by the waveform WF2 reception block 254. After being routed by the switch matrix 34, the signal is represented by the range band RB1 reception block 244.

[RB1 WF3 again] In the time interval following time t10 of FIG. 2c, movable element 41m of switch 41 of FIG. 1a has advanced by another step CCW to state or position III, so that the movable contact 41m contacts terminal 41n, as illustrated in FIG. 1c. In this position, returned signals of waveform WF3 (or WFn in the general case) are coupled through switch 41 to range band #1 signal processor 361. Processor 361 processes the return arising from waveform WF3 by reference to the time of transmission of the latest pulse (WF3 pulse 215, in this case) to produce a target indication at the appropriate range, as suggested by plot 314 of FIG. 3a. The function of reception of signal of waveform WF3 in time interval following time t10 is suggested in FIG. 2b by the waveform WF3 reception block 275. After being routed by the switch matrix 34, the signal is represented by the range band RB1 reception block 245.

Concurrently with the processing of range band 1 or RB1 signals in the arrangement of FIG. 1a by the RB1 processor, range band 2 (RB2) and range band 3 (RB3) signal processing takes place.

Figure 3B:
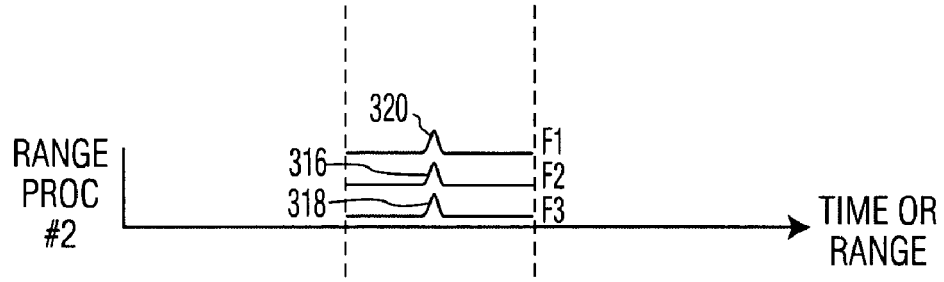

[RB2 WF1] In the time interval illustrated as time t2 to time t3 of FIG. 2a, movable element 42m of switch 42 of FIG. 1a has advanced to position II, and received signal corresponding to waveform WF1 is coupled from switch terminal 421 to terminal 42m of switch 42 and thence to range band #2 signal processor 362. Signal processor 362 Range-2 processor 362 counts time from the penultimate pulse, namely WF1 pulse 210 of FIG. 2a, and produces a signal, suggested by plot 320 of FIG. 3b, representing the return from missile target 28 of FIG. 1a. The function of reception of signal of waveform WF1 in time interval t2 to t3 is suggested in FIG. 2b by the waveform WF1 reception block 231. After being routed by the switch matrix 34, the signal is represented by the range band RB2 reception block 261. Note that the processing 261 of range-2 information as performed in time interval t2 to t3 is simultaneous with the range-1 processing 241 as illustrated in FIG. 2c. Thus, the range-1 and range-2 processing is accomplished simultaneously.

[RB2 WF2] In the time interval illustrated as time t4 to time t5 of FIG. 2a, movable element 42m of switch 42 of FIG. 1a has advanced to position III, and received signal corresponding to waveform WF2 is coupled from switch terminal 422 to terminal 42m of switch 42 and thence to range band #2 signal processor 362. Signal processor 362 Range-2 processor 362 counts time from the penultimate pulse, namely WF2 pulse 211 of FIG. 2a, and produces a signal, suggested by plot 316 of FIG. 3b, representing the return from missile target 28 of FIG. 1a. The function of reception of signal of waveform WF2 in time interval t4 to t5 is suggested in FIG. 2b by the waveform WF2 reception block 252. After being routed by the switch matrix 34, the signal is represented by the range band RB2 reception block 262.

[RB2 WF3] In the time interval illustrated as time t6 to time t7 of FIG. 2a, movable element 42m of switch 42 of FIG. 1*a* has advanced to position I, and received signal corresponding to waveform WF3 is coupled from switch terminal 42*n* to terminal 42*m* of switch 42 and thence to range band #2 signal processor 362. Signal processor 362 Range-2 processor 362 counts time from the penultimate pulse, namely WF3 pulse 212 of FIG. 2*a*, and produces a signal, suggested by plot 318 of FIG. 3*b*, representing the return from missile target 28 of FIG. 1*a*. The function of reception of signal of waveform WF3 in time interval t6 to t7 is suggested in FIG. 2*b* by the waveform WF3 reception block 273. After being routed by the switch matrix 34, the signal is represented by the range band RB2 reception block 263.

[RB2 WF1 again] In the time interval illustrated as time t8 to time t9 of FIG. 2*a*, movable element 42*m* of switch 42 of FIG. 1*a* has advanced to position II, and received signal corresponding to waveform WF1 is coupled from switch terminal 421 to terminal 42*m* of switch 42 and thence to range band #2 signal processor 362. Signal processor 362 Range-2 processor 362 counts time from the penultimate pulse, namely WF1 pulse 213 of FIG. 2*a*, and produces a signal, suggested by plot 320 of FIG. 3*b*, representing the return from missile target 28 of FIG. 1*a*. The function of reception of signal of waveform WF1 in time interval t8 to t9 is suggested in FIG. 2*b* by the waveform WF1 reception block 234. After being routed by the switch matrix 34, the signal is represented by the range band RB2 reception block 264.

[RB2 WF2 again] In the time interval illustrated as time t10 to time t11 of FIG. 2*a*, movable element 42*m* of switch 42 of FIG. 1*a* has advanced to position III, and received signal corresponding to waveform WF2 is coupled from switch terminal 422 to terminal 42*m* of switch 42 and thence to range band #2 signal processor 362. Signal processor 362 Range-2 processor 362 counts time from the penultimate pulse, namely WF2 pulse 214 of FIG. 2*a*, and produces a signal, suggested by plot 316 of FIG. 3*b*, representing the return from missile target 28 of FIG. 1*a*. The function of reception of signal of waveform WF2 in time interval t10 to t11 is suggested in FIG. 2*b* by the waveform WF2 reception block 255. After being routed by the switch matrix 34, the signal is represented by the range band RB2 reception block 265.

[RB2 WF3 again]In the time interval illustrated as time t12 to time t13 of FIG. 2*a*, movable element 42*m* of switch 42 of FIG. 1*a* has advanced to position I, and received signal corresponding to waveform WF3 is coupled from switch terminal 421 to terminal 42*m* of switch 42 and thence to range band #2 signal processor 362. Signal processor 362 Range-2 processor 362 counts time from the penultimate pulse, namely WF3 pulse 215 of FIG. 2*a*, and produces a signal, suggested by plot 318 of FIG. 3*b*, representing the return from missile target 28 of FIG. 1*a*. The function of reception of signal of waveform WF3 in time interval t12 to t13 is suggested in FIG. 2*b* by the waveform WF3 reception block 276. After being routed by the switch matrix 34, the signal is represented by the range band RB2 reception block 266.

[RB3 WF1] In the time interval illustrated as time t4 to time t5 of FIG. 2*a*, movable element 42*m* of switch 42 of FIG. 1*a* has advanced to position III, and received signal corresponding to waveform WF1 is coupled from switch terminal 431 to terminal 43*m* of switch 43 and thence to range band #3 signal processor 36*n*. Signal processor 36*n* Range-n processor 36*n* counts time from the antepenultimate pulse, namely WF1 pulse 210, and produces a signal, suggested by plot 322 of FIG. 3*b*, representing the return from mountainous clutter target 24 of FIG. 1*a*. The function of reception of signal of waveform WF1 in time interval t4 to t5 is suggested in FIG. 2*b* by the waveform WF1 reception block 232. After being routed by the switch matrix 34, the signal is represented by the range band RB3 reception block 282. Note that the processing 282 of range-3 information as performed in time interval t4 to t5 is simultaneous with the range-1 processing 242 and range-2 processing 262 as illustrated in FIG. 2*c*. Thus, the range-1, range-2 and range-3 processing is accomplished simultaneously.

[RB3 WF2] In the time interval illustrated as time t6 to time t7 of FIG. 2*a*, movable element 43*m* of switch 43 of FIG. 1*a* has advanced to position I, and received signal corresponding to waveform WF2 is coupled from switch terminal 432 to terminal 43*m* of switch 43 and thence to range band #3 signal processor 36*n*. Signal processor 36*n* Range-n processor 36*n* counts time from the antepenultimate pulse, namely WF2 pulse 211 of FIG. 2*a*, and produces a signal, suggested by plot 324 of FIG. 3*b*, representing the return from mountainous clutter target 24 of FIG. 1*a*. The function of reception of signal of waveform WF2 in time interval t6 to t7 is suggested in FIG. 2*b* by the waveform WF2 reception block 253. After being routed by the switch matrix 34, the signal is represented by the range band RB3 reception block 283.

[RB3 WF3] In the time interval illustrated as time t8 to time t9 of FIG. 2*a*, movable element 43*m* of switch 43 of FIG. 1*a* has advanced to position II, and received signal corresponding to waveform WF3 is coupled from switch terminal 43*n* to terminal 43*m* of switch 43 and thence to range band #3 signal processor 36*n*. Signal processor 36*n* Range-n processor 36*n* counts time from the antepenultimate pulse, namely WF3 pulse 212 of FIG. 2*a*, and produces a signal, suggested by plot 326 of FIG. 3*b*, representing the return from mountainous clutter target 24 of FIG. 1*a*. The function of reception of signal of waveform WF3 in time interval t8 to t9 is suggested in FIG. 2*b* by the waveform WF3 reception block 274. After being routed by the switch matrix 34, the signal is represented by the range band RB3 reception block 284.

[RB3 WF1 again] In the time interval illustrated as time t10 to time t11 of FIG. 2*a*, movable element 43*m* of switch 43 of FIG. 1*a* has advanced to position III, and received signal corresponding to waveform WF1 is coupled from switch terminal 431 to terminal 43*m* of switch 43 and thence to range band #3 signal processor 36*n*. Signal processor 36*n* Range-n processor 36*n* counts time from the antepenultimate pulse, namely WF1 pulse 213 of FIG. 2*a*, and produces a signal, suggested by plot 322 of FIG. 3*b*, representing the return from mountainous clutter target 24 of FIG. 1*a*. The function of reception of signal of waveform WF1 in time interval t10 to t11 is suggested in FIG. 2*b* by the waveform WF1 reception block 235. After being routed by the switch matrix 34, the signal is represented by the range band RB3 reception block 285.

[RB3 WF2 again] In the time interval illustrated as time t12 to time t13 of FIG. 2*a*, movable element 43*m* of switch 43 of FIG. 1*a* has advanced to position I, and received signal corresponding to waveform WF2 is coupled from switch terminal 432 to terminal 43*m* of switch 43 and thence to range band #3 signal processor 36*n*. Signal processor 36*n* Range-n processor 36*n* counts time from the antepenultimate pulse, namely WF2 pulse 214 of FIG. 2*a*, and produces a signal, suggested by plot 324 of FIG. 3*b*, representing the return from mountainous clutter target 24 of FIG. 1*a*. The function of reception of signal of waveform WF2 in time interval t12 to t13 is suggested in FIG. 2*b* by the waveform WF2 reception block 256. After being routed by the switch matrix 34, the signal is represented by the range band RB3 reception block 286.

[RB3 WF3 again] In the time interval illustrated as time t14 to time t15 of FIG. 2*a*, movable element 43*m* of switch 43 of FIG. 1*a* has advanced to position II, and received signal corresponding to waveform WF3 is coupled from switch terminal 43*n* to terminal 43*m* of switch 43 and thence to range band #2 signal processor 36*n*. Signal processor 36*n* Range-n processor 36*n* counts time from the penultimate pulse, namely WF3 pulse 215 of FIG. 2*a*, and produces a signal, suggested by plot 326 of FIG. 3*b*, representing the return from mountainous clutter target 24 of FIG. 1*a*. The function of reception of signal of waveform WF3 in time interval t14 to t15 is suggested in FIG. 2*b* by the waveform WF3 reception block 277. After being routed by the switch matrix 34, the signal is represented by the range band RB3 reception block 287.

Those skilled in the art will find it easy to extrapolate the operation of the arrangement of FIGS. 1*a*, 1*b*, and 1*c* to additional time intervals and to additional range intervals. In addition, it should be noted that the pulses deemed to have originated from a given or the same range interval may be integrated by any known method to improve the signal-to-noise ratio or other measures of radar performance.

Figure 3C:
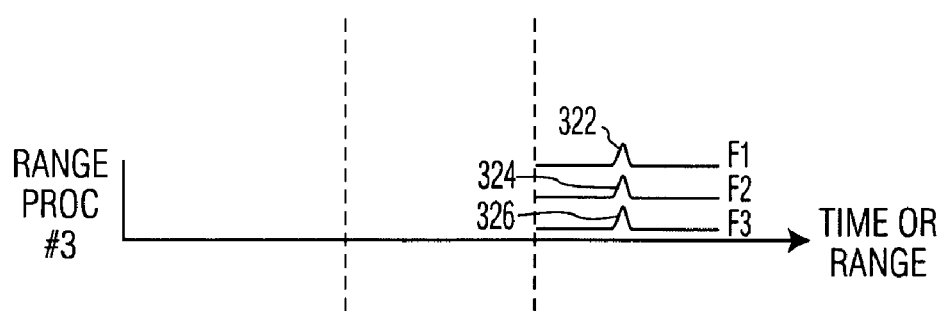

The various signals representing targets as illustrated by pulse sets 310, 312, and 314 of FIG. 3*a*, pulse sets 316, 318, and 320 of FIG. 3*b*, and pulse sets 322, 324, and 326 of FIG. 3*c* are integrated in conventional fashion to thereby provide improved signal-to-noise ratio. By comparison with the Ott et al. arrangement, the described system has the advantage that processing is performed simultaneously or concurrently for all range intervals, thereby providing additional information which improves acquisition and/or integrating time.

The description of the method for range ambiguity amelioration is simplified, in that it does not take into account the problem of range eclipsing by the inability to receive returns while transmitting pulses, which results in times, and therefore ranges, at which targets cannot be identified. This problem is readily solved by slightly adjusting the interpulse interval for some sets of transmitted pulses, so the eclipsing effect moves to a different range during a portion of the ranging system operating time. Those skilled in the art know that the processing in a digital device may be performed in parallel or in series, which are equivalent processes at least as to result. Those skilled in the art will further recognize that if the radar system is capable of transmitting one waveform or frequency, while simultaneously receivig another waveform or frequency, that the range eclipsing problem may be solved by continuing to receive waveforms previously transmitted, while the current waveform is being transmitted.

If the difference between transmitted waveforms is carrier frequency, the function of the switch matrix 34 of FIG. 1*a* may be replaced when a receiver local oscillator is used in which the frequency is tunable. The local oscillator is retuned from time to time in consonance with the change in the transmitter frequency, so as to give the effect of translating pulses from a given range-band into the same filter's passband.

It should be understood that, while the illustrated system transmits two sets of 3 distinct waveforms, so that the receiver may integrate a total of six pulses, in the general case, M sets of N distinct waveforms may be employed.

It should be further understood that if the radar system uses N mutually distinguishable waveforms, resulting in N separable range bands, targets lying beyond the Nth range band may be observed. In this case, range ambiguity will be ameliorated, but not eliminated entirely.

A method for range detection of targets (22, 24, 26) according to an aspect of the invention comprises the step of recurrently transmitting sequential electromagnetic signal pulses (210, 211, 212, 213, 214, 215) of at least first (WF1) and second (WF2) mutually different waveforms, to thereby produce sequentially transmitted first (210) and second (211) pulses. During at least some interpulse intervals (t2 to t3) following the transmitted pulses (210, 211), reflected signals, if any, resulting from the recurrent transmissions are received, to thereby produce received signals nominally of the first (WF1) and second (WF2) waveforms. The received signals of the first (WF1) and second (WF2) waveforms received during that interpulse period (t2–t3) immediately following transmission of the second pulses are processed concurrently. Those received signals (312) returning with the second waveform (WF2) are deemed to be within a range corresponding to zero to one inter-pulse interval and those received signals returning with the first waveform (WF1) are deemed to be within a range corresponding to one to two inter-pulse intervals.

A method for range determination of targets (22, 24, 26) according to another aspect of the invention comprises the steps of recurrently transmitting a set of electromagnetic signal pulses (210, 211, 212, 213, 214, 215), with each set of pulses including sequential pulses (210, 211, 212, 213, 214, 215) of at least first (WF1), second (WF2), and third (WF3) mutually different frequencies, to thereby produce recurrent sets of transmitted first (210, 213), second (211, 214), and third (212, 215) pulses. During each interpulse interval lying between the transmitted pulses, reflected signals, if any, resulting from the recurrent transmissions are received, to thereby produce received signals nominally of or related to the first (WF1), second (WF2), and third (WF3) waveforms. The received signals are sorted by frequency into first (41, 361), second (42, 362), and third (43, 36*n*) channels, respectively, and during that interpulse interval (t4–t5; t10– . . . ) immediately following transmission of each of the third pulses (212, 212), the received signals of the third waveform (WF3) are processed, and those received signals returning with the third waveform (WF3) are deemed to be within a range corresponding to zero to one inter-pulse interval. During that interpulse interval (t4–t5; t10– . . . ) immediately following transmission of each of said third pulses (212, 212), the received signals of the second waveform (WF2) are processed, and those received signals returning with the second waveform are deemed to be within a range corresponding to one to two inter-pulse intervals. During that interpulse interval (t4–t5; t10– . . . ) immediately following transmission of each of the third pulses, the received signals of the first frequency are processed, and those received signals returning with the first waveform are deemed to be within a range corresponding to two to three inter-pulse intervals.

More generally, a method for ranging targets according to an aspect of the invention includes the steps of recurrently transmitting electromagnetic signal pulses of at least first, second, . . . , and Nth mutually different waveforms to thereby produce transmitted first, second, . . . , and Nth pulses. During interpulse intervals lying between the transmitted pulses, reflected signals, if any, resulting from the recurrent transmissions are received, to thereby produce received signals nominally of the first, second, . . . , and Nth waveforms. The received reflected signals are sorted by waveform into first, second, . . . , and Nth channels, respectively. During that interpulse interval immediately following transmission of each of the Nth pulses, the received signals of the Nth waveform are processed, and those received signals returning with the Nth waveform are deemed to be within a range corresponding to zero to one inter-pulse interval.

During the Jth interpulse interval following transmission of each of the first pulses, the received signals of the Kth waveform are processed, for K=1,2, . . . N, and those received signals returning of the Kth waveform are deemed to be within a range corresponding (J−K) to (1+J−K) interpulse intervals.

During the Nth interpulse interval following transmission of each of the first pulses, the received signals of the first waveform are processed, and those received signals returning with the first waveform are deemed to be within a range corresponding to (N−1) to N inter-pulse intervals.

What is claimed is:

1. A method for range determination of targets, said method comprising the steps of:
   recurrently transmitting sequential electromagnetic signal pulses of at least first and second mutually different waveforms, to thereby produce sequentially transmitted first and second pulses;
   during at least some interpulse intervals following said transmitted pulses, receiving reflected signals, if any, resulting from said recurrent transmissions, to thereby concurrently produce received signals nominally of said first and second waveforms;
   concurrently processing said received signals of said first and second waveforms received during that interpulse period immediately following transmission of said second pulses, and deeming those received signals returning with said second waveform to be within a range corresponding to zero to one inter-pulse interval and deeming those received signals returning with said first waveform to be within a range corresponding to one to two inter-pulse intervals.

2. A method for range determination of targets, said method comprising the steps of:
   recurrently transmitting electromagnetic signal pulses of at least first, second, and third mutually different waveforms to thereby produce transmitted first, second, and third pulses;
   during each interpulse interval lying between said transmitted pulses, receiving reflected signals, if any, resulting from said recurrent transmissions, to thereby produce received signals nominally of said first, second, and third waveforms;
   sorting said received signals by waveform into first, second, and third channels, respectively;
   during that interpulse interval immediately following transmission of each of said third pulses, processing said received signals of said third waveform, and deeming those received signals returning with said third waveform to be within a range corresponding to zero to one inter-pulse interval;
   during said interpulse interval immediately following transmission of each of said third pulses, processing said received signals of said second waveform, and deeming those received signals returning with said second waveform to be within a range corresponding to one to two inter-pulse intervals; and
   during said interpulse interval immediately following transmission of each of said third pulses, processing said received signals of said first waveform, and deeming those received signals returning with said first waveform to be within a range corresponding to two to three inter-pulse intervals.

3. A method for range determination of targets, the method comprising the steps of:
   recurrently transmitting electromagnetic signal pulses of at least first, second, . . . , and Nth mutually different waveforms to thereby produce transmitted first, second, . . . , and Nth pulses;
   during each interpulse interval immediately following said transmitted pulses, receiving reflected signals, if any, resulting from the recurrent transmissions, to thereby produce concurrent received signals nominally of the first, second, . . . , and Nth waveforms;
   sorting the received signals by waveform into first, second, . . . , and Nth channels, respectively;
   During the Jth interpulse interval, processing received signals having the Kth waveform, for K=1,2, . . . N, and deeming those signals returning with the Kth waveform, to have been reflected from a range greater than (J−K) interpulse intervals, and less than (1+J−K) interpulse intervals.

4. A method for range determination of targets, said method comprising the steps of:
   recurrently transmitting sequential electromagnetic signal pulses at at least first and second mutually different frequencies, to thereby produce sequentially transmitted first and second pulses;
   during at least some interpulse intervals following said transmitted pulses, receiving reflected signals, if any, resulting from said recurrent transmissions, to thereby concurrently produce received signals nominally at said first and second frequencies;
   concurrently processing said received signals at said first and second frequencies received during that interpulse period immediately following transmission of said second pulses, and deeming those received signals returning at said second frequency to be within a range corresponding to zero to one inter-pulse interval and deeming those received signals returning at said first frequency to be within a range corresponding to one to two inter-pulse intervals.

5. A method for range determination of targets, said method comprising the steps of:
   recurrently transmitting electromagnetic signal pulses at at least first, second, and third mutually different frequencies to thereby produce transmitted first, second, and third pulses;
   during each interpulse interval lying between said transmitted pulses, receiving reflected signals, if any, resulting from said recurrent transmissions, to thereby produce received signals nominally at said first, second, and third frequencies;
   sorting said received signals by frequency into first, second, and third channels, respectively;
   during that interpulse interval immediately following transmission of each of said third pulses, processing said received signals at said third frequency, and deeming those received signals returning at said third frequency to be within a range corresponding to zero to one inter-pulse interval;
   during said interpulse interval immediately following transmission of each of said third pulses, processing said received signals at said second frequency, and deeming those received signals returning at said second frequency to be within a range corresponding to one to two inter-pulse intervals; and during said interpulse interval immediately following transmission of each of said third pulses, processing said received signals at said first frequency, and deeming those received signals returning at said first frequency to be within a range corresponding to two to three inter-pulse intervals.

6. A method for range determination of targets, the method comprising the steps of:

recurrently transmitting electromagnetic signal pulses at at least first, second, . . . , and Nth mutually different frequencies to thereby produce transmitted first, second, . . . , and Nth pulses;

during each interpulse interval immediately following said the transmitted pulses, receiving reflected signals, if any, resulting from the recurrent transmissions, to thereby produce concurrent received signals nominally at the first, second, . . . , and Nth frequencies;

sorting the received signals by frequency into first, second, . . . , and Nth channels, respectively;

during that interpulse interval immediately following transmission of each of the Nth pulses, processing the received signals at the Nth frequency, and deeming those received signals returning at the Nth frequency to be within a range corresponding to zero to one inter-pulse interval;

during that interpulse interval immediately following transmission of each of the Nth pulses, processing the received signals at the second frequency, and deeming those received signals returning at the second frequency to be within a range corresponding to corresponding to (N−2) to (N−1) inter-pulse intervals; and during that interpulse interval immediately following transmission of each of the Nth pulses, detecting the received signals at the first frequency, and deeming those received signals returning at the first frequency to be within a range corresponding to (N−1) to (N) inter-pulse intervals.

7. A method for range determination of targets, said method comprising the steps of:

recurrently transmitting a set of electromagnetic signal pulses, wherein each said set of pulses includes at least first, second, and third mutually different frequencies to thereby produce transmitted first, second, and third pulses at mutually different frequencies;

during each interpulse interval lying between said transmitted first, second, and third pulses, receiving reflected signals, if any, resulting from said recurrent transmissions, to thereby produce received signals nominally at said first, second, and third frequencies;

during that interpulse interval immediately following transmission of said first pulse, processing said received signals at said first frequency, and deeming those received signals returning at said first frequency to be within a range corresponding to zero to one inter-pulse interval;

during said interpulse interval immediately following transmission of said second pulse, processing said received signals at said first frequency, and deeming those received signals returning at said first frequency to be within a range corresponding to one to two inter-pulse intervals;

during said interpulse interval immediately following transmission of said second pulse, processing said received signals at said second frequency, and deeming those received signals returning at said second frequency to be within a range corresponding to zero to one inter-pulse interval;

during said interpulse interval immediately following transmission of each of said third pulses, processing said received signals at said first, second, and third frequencies, and deeming those received signals returning at said first frequency to be within a range corresponding to two to three inter-pulse intervals, those received signals at said second frequency to be within a range corresponding to one to two inter-pulse intervals, and those received signals at said third frequency to be within a range corresponding to zero to one inter-pulse intervals.

8. A method for range determination of targets, the method comprising the steps of:

recurrently transmitting electromagnetic signal pulses at at least first, second, . . . , J . . . , and Nth mutually different frequencies to thereby produce transmitted first, second, . . . , I, . . . , and Nth pulses;

during each interpulse interval immediately following said transmitted pulses, receiving reflected signals, if any, resulting from the recurrent transmissions, to thereby produce concurrent received signals nominally at the first, second, . . . , and Nth frequencies;

sorting the received signals by frequency into first, second, . . . , Ith, . . . , and Nth channels, respectively; and during that interpulse interval immediately following transmission of each of the Ith pulses, processing the received signals at the corresponding Jth frequency, and deeming those received signals returning at the Jth frequency to be within a range corresponding to (I−J) to (1+I−J) inter-pulse intervals.

* * * * *